United States Patent
Cousins et al.

(10) Patent No.: US 10,592,748 B1
(45) Date of Patent: Mar. 17, 2020

(54) MAIL ITEM MANAGER FOR SORTING MAIL ITEMS USING AUGMENTED REALITY GLASSES

(71) Applicants: Steve Cousins, Nashville, TN (US); Nicole Blohm, Mount Pleasant, SC (US)

(72) Inventors: Steve Cousins, Nashville, TN (US); Nicole Blohm, Mount Pleasant, SC (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/355,426

(22) Filed: Mar. 15, 2019

(51) Int. Cl.
| B07C 3/20 | (2006.01) |
| G06K 9/00 | (2006.01) |
| G06Q 50/28 | (2012.01) |
| G02B 27/01 | (2006.01) |
| G06F 1/16 | (2006.01) |

(52) U.S. Cl.
CPC ..... G06K 9/00671 (2013.01); G02B 27/0172 (2013.01); G06Q 50/28 (2013.01); *G02B 2027/0178* (2013.01); *G06F 1/163* (2013.01); *G06K 2209/01* (2013.01)

(58) Field of Classification Search
None
See application file for complete search history.

(56) References Cited

U.S. PATENT DOCUMENTS

| 7,201,316 B2* | 4/2007 | Anderson | B07C 3/20 |
| | | | 235/382 |
| 8,046,308 B2* | 10/2011 | Miette | G06Q 10/083 |
| | | | 705/337 |
| 8,110,052 B2* | 2/2012 | Olsen | B07C 7/005 |
| | | | 156/366 |
| 10,346,891 B2* | 7/2019 | Amato | G06Q 10/107 |
| 10,366,299 B2* | 7/2019 | Bowne | G06K 9/36 |
| 2001/0032805 A1* | 10/2001 | Lawandy | B07C 5/3412 |
| | | | 209/3.3 |

(Continued)

OTHER PUBLICATIONS

Cousins, U.S. Appl. No. 16/,355,421, filed Mar. 15, 2019, Notice of Allowance dated Oct. 4, 2019.

*Primary Examiner* — Martin Mushambo
(74) *Attorney, Agent, or Firm* — Hickman Palermo Becker Bingham LLP; Edward A. Becker

(57) ABSTRACT

An approach is provided for performing sorting of physical mail items using Augmented Reality (A/R) glasses. A/R glasses acquire an image of a physical mail item to be sorted and generate image data that represents the image. A unique value is generated for the image, for example, by processing the image data for the image using one or more hash functions to generate a hash value. The hash value is used to obtain sorting information for the mail item from a mail item manager. The A/R glasses use the sorting information to assist the user in sorting the mail item by displaying the name of a sort location for the mail item, visually distinguishing the sort location from other sort locations, displaying information about the mail item, providing "out of view" assistance, etc. The A/R glasses may allow the user to override the sort location specified for the mail item and override information is sent to the mail item manager.

20 Claims, 12 Drawing Sheets

(56) References Cited

U.S. PATENT DOCUMENTS

| | | | |
|---|---|---|---|
| 2004/0182925 A1* | 9/2004 | Anderson | B07C 3/20 235/385 |
| 2006/0253406 A1* | 11/2006 | Caillon | B07C 3/00 705/410 |
| 2009/0141934 A1* | 6/2009 | Caillon | G06K 9/3216 382/102 |
| 2010/0040256 A1* | 2/2010 | Rundle | G06K 9/00979 382/101 |
| 2015/0076043 A1* | 3/2015 | Serjeantson | B07C 3/14 209/584 |
| 2015/0110343 A1* | 4/2015 | Worth, II | B07C 7/005 382/101 |
| 2018/0029083 A1* | 2/2018 | Farlotti | B07C 3/003 |

* cited by examiner

Mail Item Management Data 156

| Hash Value | Image Data | OCR Data | Sort Location | Information/Status |
|---|---|---|---|---|
| HV1 | IMG1 | OCR1 | Loc1 | IS1 |
| HV2 | IMG2 | OCR2 | Loc2 | IS2 |
| HV3 | IMG3 | OCR3 | Loc3 | IS3 |
| HV4 | IMG4 | OCR4 | Loc4 | IS4 |

Mail Item Manager 170
- Mail Item Management Application 172
- OCR Application 174
- Mail Item Management Data 176

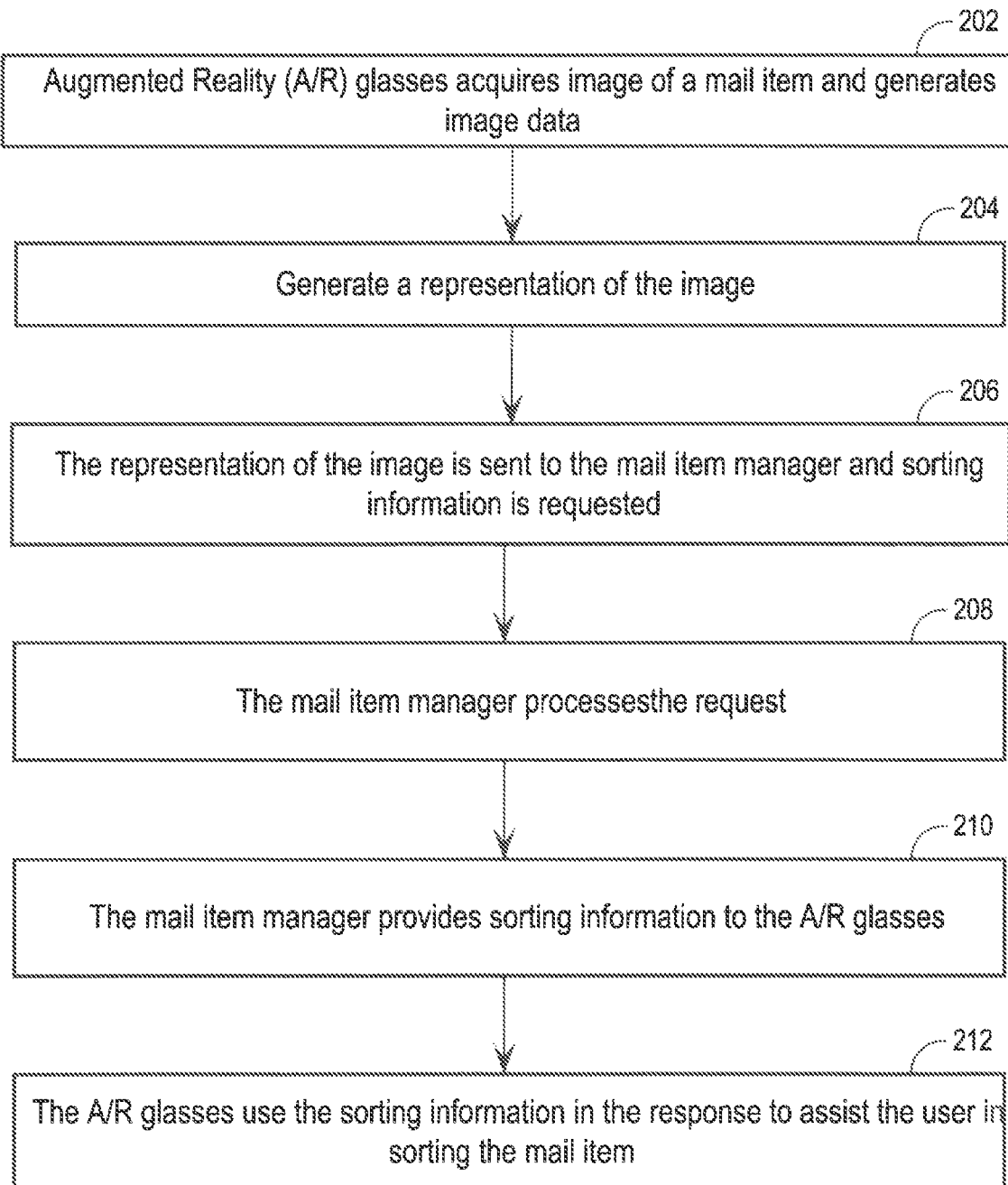

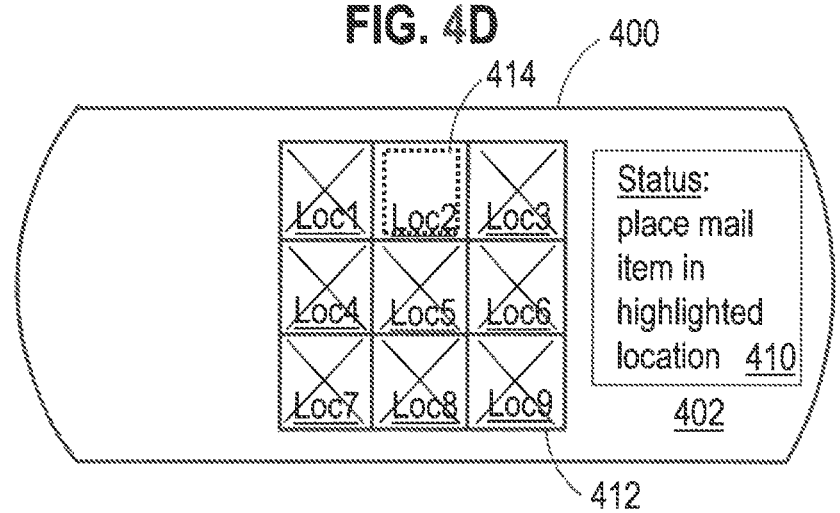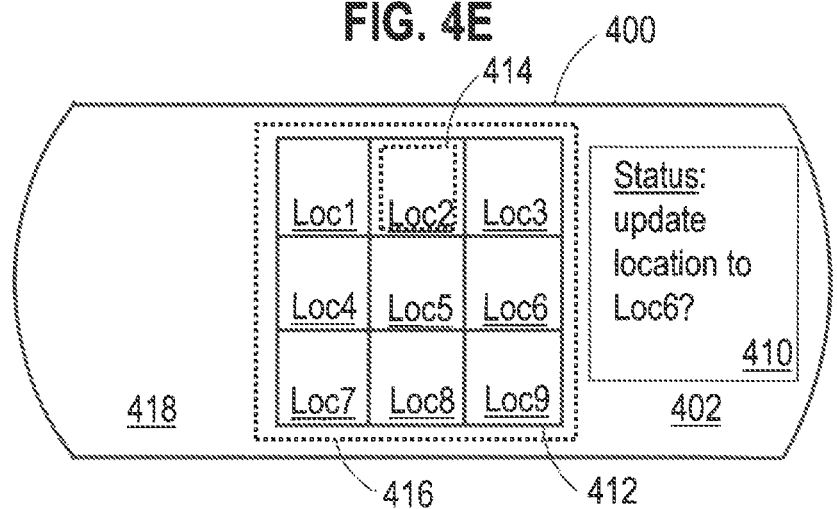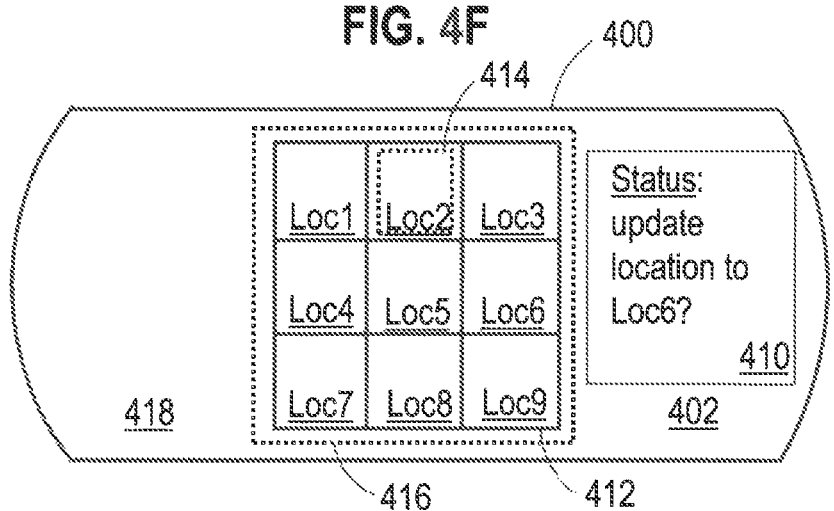

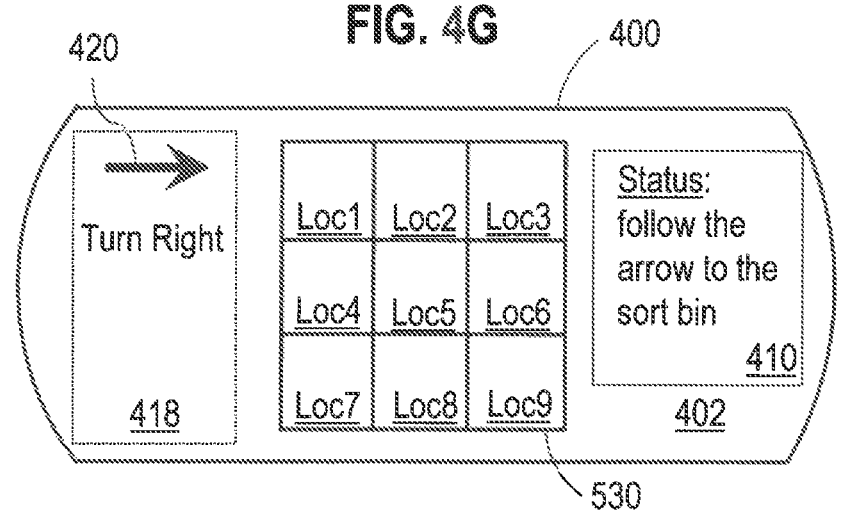

MAIL ITEM MANAGER FOR SORTING MAIL ITEMS USING AUGMENTED REALITY GLASSES

RELATED APPLICATION DATA AND CLAIM OF PRIORITY

This application is related to U.S. patent application Ser. No. 16/355,430 entitled "TRACKING AND MANAGING MAIL ITEMS USING IMAGE RECOGNITION", filed Mar. 15, 2019, and U.S. patent application Ser. No. 16/355,413 entitled "MAIL ITEM SORTING USING AUGMENTED REALITY GLASSES", filed Mar. 15, 2019 and U.S. patent application Ser. No. 16/355,421 entitled "DETERMINING THE POSITION OF A SORT LOCATION FOR AUGMENTED REALITY GLASSES", filed Mar. 15, 2019, the contents all of which are incorporated by reference in their entirety for all purposes as if fully set forth herein.

FIELD

The technical field of the present disclosure relates to improved methods, systems, computer software, and/or computer hardware in the field of sorting physical mail items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Conventional approaches for sorting physical mail items rely upon manual reading of recipient information and/or sort locations on the physical mail items, followed by manual sorting of the mail items to designated sort locations. The process may also include manually printing and attaching to the physical mail items identifying information, such as a label, bar code, QR code, RFID tag, or the like, for tracking and management purposes. These approaches are necessarily labor intensive and prone to error, especially at locations that receive a large number of physical mail items. In addition, they are not able to handle changes in sort locations that occurred after mail items were put into the sort process, which results in incorrect sorts.

SUMMARY

A human-wearable computing device comprises a display, an image acquisition component, one or more processors, one or more memories, and a mail sorting application executing on the human-wearable computing device. The mail sorting application is configured to cause the image acquisition component to acquire an image of a physical mail item disposed within a field of view of the image acquisition component and generate image data that represents the image of the physical mail item. The mail sorting application is further configured to cause a representation of the image data that represents the image of the physical mail item to be generated, wherein the representation uniquely identifies the image and cause the representation of the image data that represents the image of the physical mail item to be transmitted to a mail item management application. The mail sorting application also receives, from the mail item management application, sorting information that corresponds to the representation of the image data that represents the image of the physical mail item, and causes to be superimposed on a viewable area of the display based upon the sorting information that corresponds to the representation of the image data that represents the image of the physical mail item, information that assists a user of the human-wearable computing device in placing the physical mail item at a correct sort location.

A human-wearable computing device comprises a display, an image acquisition component, one or more processors, one or more memories, and a mail sorting application executing on the human-wearable computing device. The mail sorting application is configured to cause the image acquisition component to acquire an image of a physical mail item disposed within a field of view of the image acquisition component and generate image data that represents the image of the physical mail item and cause a representation of the image data that represents the image of the physical mail item to be generated, wherein the representation uniquely identifies the image. The mail sorting application is further configured to cause the representation of the image data that represents the image of the physical mail item to be transmitted to a mail item management application, and receive, from the mail item management application, sorting information that corresponds to the representation of the image data that represents the image of the physical mail item, wherein the sorting information includes a physical sort location for the physical mail item. The mail sorting application determines, based upon the physical sort location for the physical mail item, a display location on the display that corresponds to the physical sort location for the physical mail item, and causes the display location on the display to be visually distinguished from other display locations on the display to assist a user of the human-wearable computing device in placing the physical mail item at the physical sort location.

A computing device comprises one or more processors, one or more memories and a mail item manager executing on the computing device. The mail item manager is configured to receive, from a human-wearable computing device, image representation data that uniquely identifies an image of a physical mail item from a plurality of physical mail items, and identify an entry in mail item management data includes an entry having a value that is the same as the image representation data that represents the image of the physical mail item. The mail item manager is further configured to retrieve, from the entry in the mail item management data, data that specifies a physical sort location for the physical mail item, and generate sorting information that includes the physical sort location for the physical mail item. The mail item manager causes the sorting information to be transmitted to the human-wearable computing device, wherein the human-wearable computing device uses the sorting information to assist a user of the human-wearable computing device in placing the physical mail item at the physical sort location.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

FIG. 2 is a flow diagram that depicts an approach for enhanced sorting of mail items using A/R glasses, according to an embodiment.

FIG. 4D depicts an example view provided by A/R glasses in which the sort location is visually distinguished from other sort locations using multiple visual indicators.

FIG. 4E depicts an example view provided by A/R glasses in which a reference frame is displayed within the viewable area of display to aid the user in correctly positioning and aligning A/R glasses with respect to sort bins.

FIG. 4F depicts an example view provided by A/R glasses in which the user of A/R glasses places the mail item in a different location than the designated sort location.

FIG. 4G depicts an example of "out of view" assistance provided by A/R glasses.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Mail Item Sorting Architecture
  A. Mail Item Sorting Facility
  B. Augmented Reality (A/R) Glasses
  C. Mail Item Manager
III. Mail Item Sorting Using A/R Glasses
  A. Overview
  B. Obtaining Sorting Information For A Mail Item
  C. Using Sorting Information To Assist A User In Sorting Mail Items
  D. User Override of Sort Locations
  E. Determining Sort Locations On A/R Glasses
  F. "Out of View" Assistance
IV. Implementation Examples

I. OVERVIEW

An approach is provided for performing sorting of physical mail items using Augmented Reality (A/R) glasses. According to the approach, A/R glasses acquire an image of a physical mail item to be sorted and generate image data that represents the image. As used herein, the terms "physical mail item" and "mail item" refer to any physical item that may be mailed. Examples include, without limitation, cards, envelopes, packages, items of commerce, etc.

The captured image may include one or more portions of the mail item, or the entire mail item, from any angle. The image may include any information on the mail item, such as sender information, recipient information, a postmark, a cancellation, as well as artifacts on the mail item, such as seams, markings, coloration, texture, damage, etc. A unique value is generated for the image, for example, by processing the image data for the image using one or more hash functions to generate a hash value. The hash value uniquely identifies the mail item based upon the information included in the image, such as the sender and recipient information, postmark, cancellation, artifacts, etc. The hash value is used to obtain sorting information for the mail item from a mail item manager. The A/R glasses use the sorting information to assist the user in sorting the mail item. This may include, for example, displaying the name of a sort location for the mail item, visually distinguishing the sort location for the mail item from other sort locations, displaying information about the mail item, providing "out of view" assistance, etc. The A/R glasses may allow the user to override the sort location specified for the mail item and override information is sent to the mail item manager to update information for the mail item. This approach improves sorting speed, reduces sorting errors, and provides a more favorable user experience than conventional manual sorting approaches.

II. MAIL ITEM SORTING ARCHITECTURE

Figure 1A:
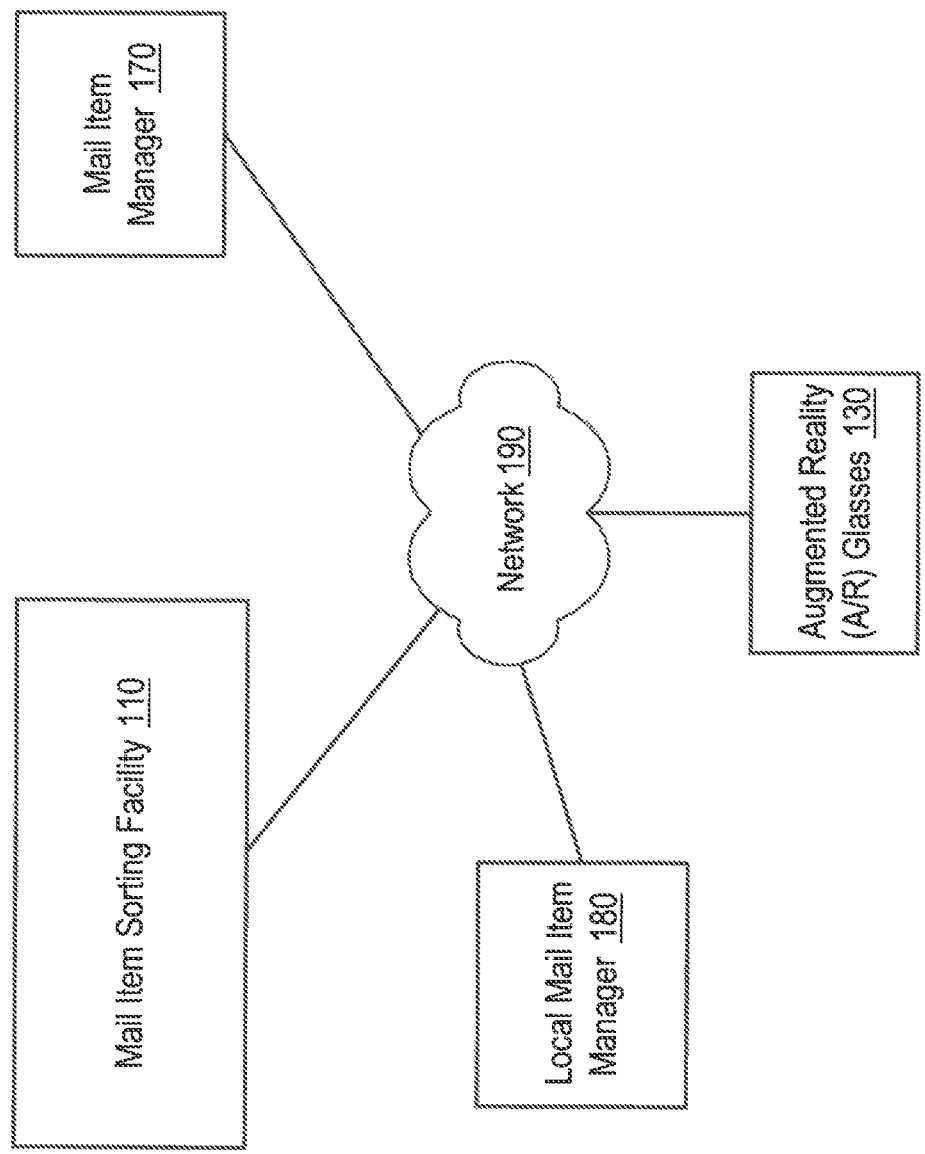
FIG. 1A is a block diagram that depicts an arrangement for sorting mail items A/R glasses.

FIG. 1A is a block diagram that depicts an arrangement 100 for sorting mail items A/R glasses. Arrangement 100 includes a mail item sorting facility 110, A/R glasses 130, a mail item manager 170, and a local mail item manager 180, communicatively coupled via a network 190. Although network 190 is depicted and described herein in the context of a single network, network 190 may be implemented by one or more wireless and/or wired computer networks of any type. In addition, the elements depicted in FIG. 1A may have direct communications links.

A. Mail Item Sorting Facility

Mail item sorting facility 110 is a physical location, or multiple physical locations, at which mail items are sorted. Mail item sorting facility 110 is not limited to any particular implementation and examples of mail item sorting facility 110 include, without limitation, a mail department within a business enterprise, organization, private mail entity, government mail entity, etc., a warehouse, shipping facility, etc.

Figure 1B:
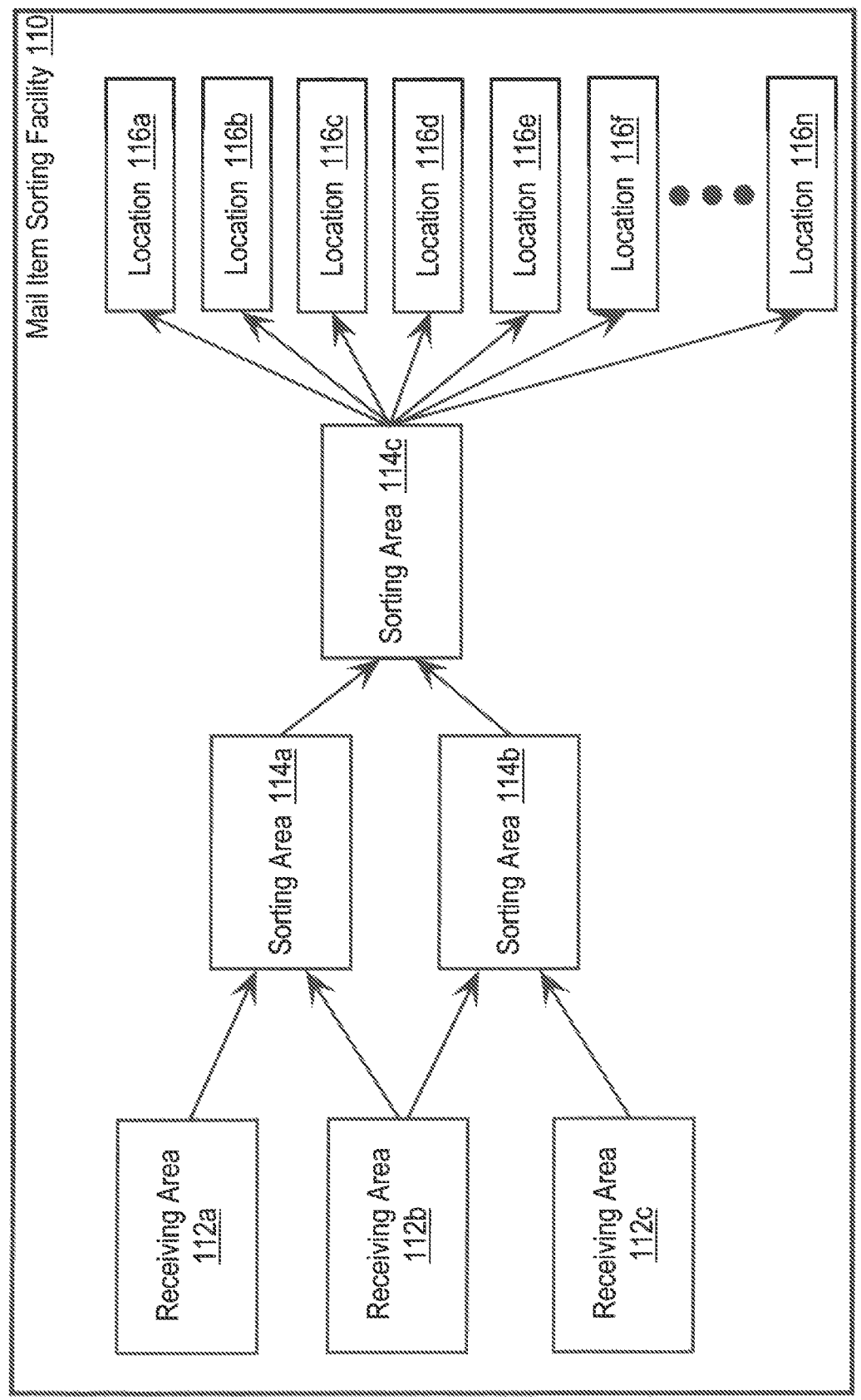
FIG. 1B is a block diagram that depicts an example implementation of a mail item sorting facility.

FIG. 1B is a block diagram that depicts an example implementation of mail item sorting facility 110. Mail items are received at receiving areas 112a, 112b, 112c, which may represent physical areas, such as a mail receiving portal, mail receiving boxes or doors, a department or area, etc., of a business enterprise, organization, etc., for receiving mail items. Mail items may be processed at receiving area 112a, 112b, 112c, for example, by printing and applying a label, RFID tag, etc., to mail items to allow the mail items to be tracked and managed within mail item sorting facility 110 and outside of mail item sorting facility 110. Mail items are then routed to sorting areas 114a, 114b, which are physical areas for sorting mail items, and may represent a mail sorting area and/or equipment within an organization. The mail items are sorted at sorting area 114a, 114b and supplied to sorting area 114c, which is also a physical area for sorting mail items. Sorting areas 114a, 114b may represent a first level of sorting within an organization and sorting area 114c a second level of sorting within the organization. Embodiments are not limited to the example depicted in FIG. 1B and are applicable to any number and type of sorting levels and entities that may vary depending upon a particular implementation.

The mail items are then sorted by sorting area 114c to locations 116a-116n. Locations 116a-116n are physical locations that may represent, for example, mail boxes, bins, work locations such as work areas or stations, destination ports, doors, shipping docks, etc., internal to or external to mail item sorting facility 110, including locations within or external to an organization. Locations 116a-116n may be intermediate or final locations, including final destinations.

B. Augmented Reality (A/R) Glasses

Augmented Reality (A/R) glasses 130 are eyeglasses that allow the wearer to see both their normal surroundings and information displayed on the eyeglasses so that the information appears superimposed on the normal surroundings. The information may include, for example, information about the user's bodily functions, such as heart rate, temperature, etc., current location, information about the current location and surroundings, air temperature, etc. According to an embodiment, the information assists the user in sorting mail items, such as an intended location for a particular mail item, as described in more detail hereinafter. Although embodiments are depicted in the figures and described herein in the context of a single A/R glasses 130, this is done for explanation purposes only and embodiments are applicable to any number of A/R glasses 130. For example, a large receiving and sorting facility for mail items may include large numbers of A/R glasses 130. In addition, A/R glasses 130 are not limited to A/R glasses per se, and are applicable to any type of human-wearable device that allows the wearer to see both their normal surroundings and information about mail items displayed on a display in a manner where the information appears superimposed on the normal surroundings.

Figure 1C:
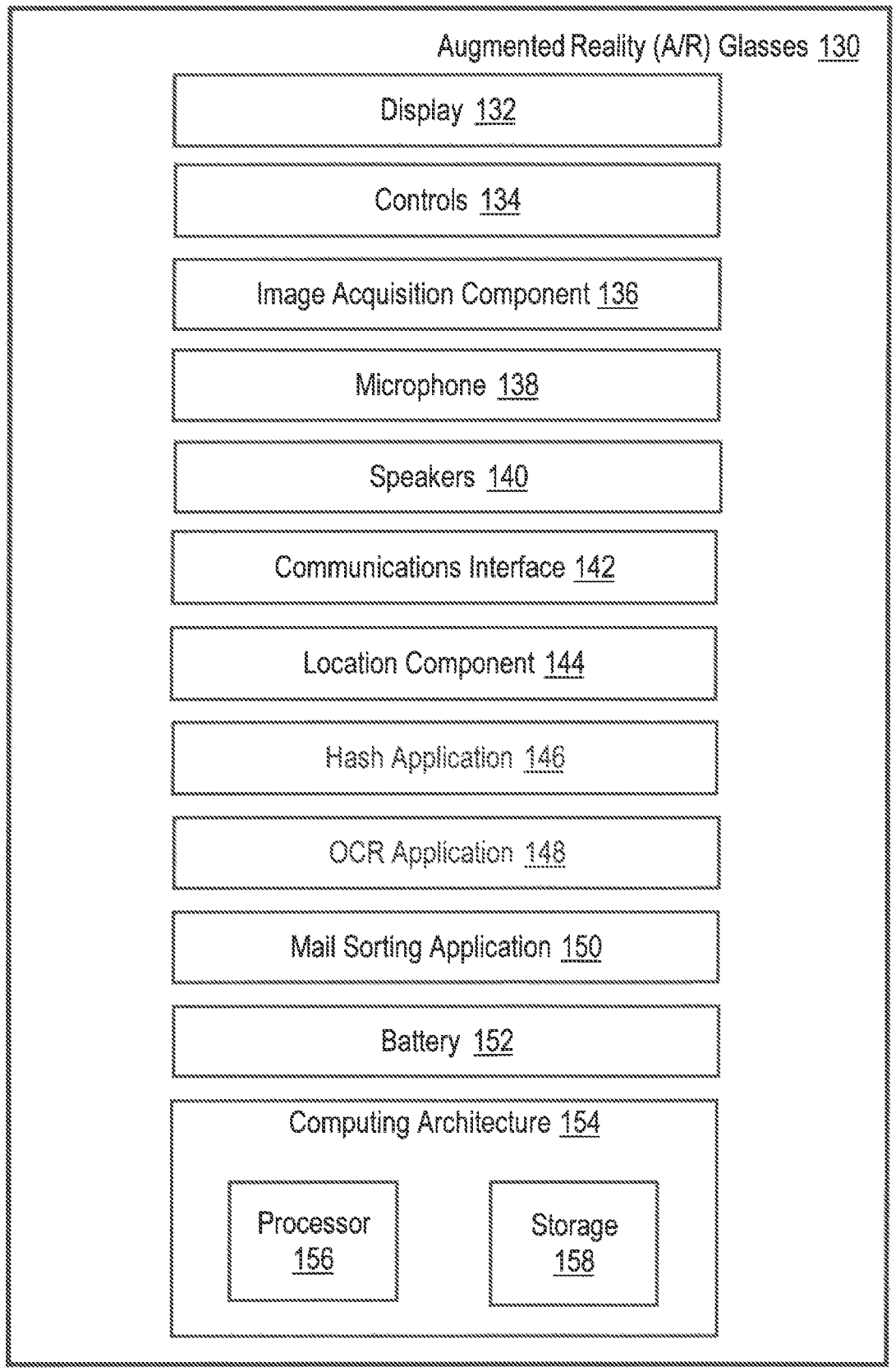
FIG. 1C depicts an example embodiment of A/R glasses.

FIG. 1C depicts an example embodiment of A/R glasses 130 and includes a display 132, controls 134, an image acquisition component 136, a microphone 138, speakers 140, a communications interface 142, a hash application 146, and Optical Character Recognition (OCR) application 148, a mail sorting application 150, a battery, and a computing architecture 154. Embodiments of A/R glasses 130 are not limited to the example depicted in FIG. 1C and A/R glasses 130 may have fewer elements or additional elements, depending upon a particular implementation.

Display 132 allows A/R glasses 130 to display information to a user. Display 132 may be implemented in the form of eyeglass lenses, one or more displays or screens, etc. Display 132 is configured to display text and/or images in black and white and/or color. Display 132 may also be configured to accept user input via a touch screen.

Controls 134 allow a user to provide user input to A/R glasses 130 and may include, for example, physical controls such as buttons, sliders, etc., and soft controls, such as graphical user interface objects, displayed on display 132. Embodiments may also include remote controls. For example, a physical controller, external touchscreen, or other device may include physical or soft controls that allow a user to provide input to A/R glasses 130. These devices may communicate with A/R glasses 130 via a wired or wireless connection.

Image acquisition component 136 acquires images of mail items and generates image data that represents the images. Image acquisition component 136 may include, for example, one or more cameras and associated computer hardware and/or computer software or firmware.

Microphone 138 receives audio input from a user and converts the audio input into electronic signals. According to an embodiment, A/R glasses 130 support voice recognition and recognizes spoken commands for controlling A/R glasses 130. Speakers 140 converts audio signals into audio output for users. Communications interface 142 allows A/R glasses 130 to communicate with other devices over network 190 and may be implemented by one or more wireless and/or wired computer communications interfaces to support communications via BlueTooth, WiFi, WiGig, Near Field Communication (NFC), etc. A location component 144 is an element that determines a current location of A/R glasses 130. The current location may be determined based upon data from sensors, such as GPS sensors, proximity sensors, etc.

Hash application 146 is a process configured to process image data for an image of a mail item and generate a hash value that uniquely identifies the image and the mail item. Hash application 146 may implement one or more hash functions of any type. Alternatively, hash application 146 may invoke one or more external hash functions, for example, by issuing one or more commands to a hash function library via an Application Program Interface (API) of the hash function library. Embodiments are applicable to any type of hash function. Example hash functions include, without limitation, MD5, SHA-1, and SHA-2.

OCR application 148 processes image data and generates OCR data that includes text identified in the image data. OCR application 148 may itself implement OCR functionality that recognizes text in image data, or OCR application 148 may invoke OCR functionality that is external to OCR application 148, for example, by making calls to external OCR services. OCR application 148 may be implemented by one or more processes executing on A/R glasses 130.

Mail sorting application 150 manages the various elements on A/R glasses 130 to assist users in sorting mail items. This includes causing image acquisition component 136 to acquire an image of a mail item and generate image data that represents the image. Mail sorting application 150 causes data to be generated that uniquely identifies the image data, and the corresponding image. For example, mail sorting application 150 may invoke hash application 146 to generate a hash value for the image data. Mail sorting application 150 then supplies the hash value to mail item manager 170 and receives and a sorting information for the mail item. Mail sorting application 150 then uses the sorting information to guide the user to the correct sort location via display 132, as described in more detail hereinafter. Mail sorting application 150 also processes user input received via controls 134 and/or microphone 138 to override a sort location. The new sort location may be provided to mail item manager 170.

Mail sorting application 150 may provide a graphical user interface with controls that allows a user to initiate these functions. For example, the graphical user interface may include a control that allows a user to capture an image of a mail item and generate image data, generate a hash value that uniquely represents the image, and transmit the hash value, image data, and other information to mail item management application 172. Mail sorting application 150 may also be configured to perform these functions in response to a signal. For example, A/R glasses 130 may be implemented at a mail processing facility that generates a signal when a mail item is in position within the capture area of image acquisition component 136. Mail sorting application 150 performs the aforementioned functions in response to receiving the signal.

Battery 152 provides electrical power to A/R glasses 130 and may include any number of batteries of any type. Computing architecture 154 includes a processor 156 and storage 158 and supports the execution of computing processes and the storage of data on A/R glasses 130. Processor 156 may be one or more computer processors that are capable of executing instructions stored in storage 158. Storage 158 may be implemented by volatile storage, non-volatile storage, or any combination of volatile and non-volatile storage.

C. Mail Item Manager

Figures 1D, 1E:
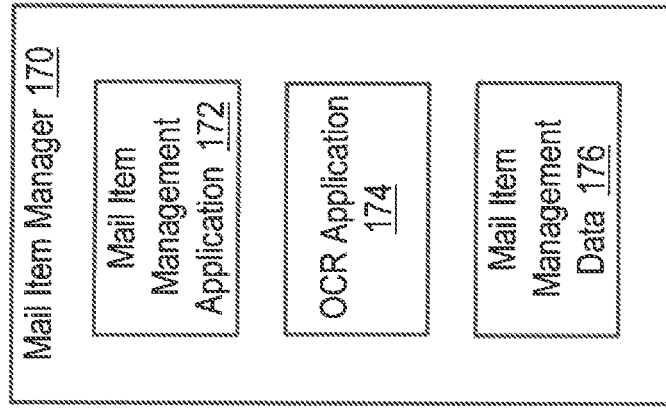
FIG. 1D is a block diagram that depicts an example embodiment of a mail item manager.
FIG. 1E depicts an example embodiment of mail item management data in the form of a table, where each row of the table corresponds to a mail item and includes a hash value, image data, OCR data, a sort location, and status history.

Mail item manager 170 is an entity that manages information for mail items and provides sort location and other information about mail items to A/R glasses 130 to assist users in sorting mail items. FIG. 1D is a block diagram that depicts an example embodiment of mail item manager 170 and includes a mail item management application 172, also referred to herein as a mail item management process, an OCR application 174, and mail item management data 176. Mail item manager 170 may include other elements that may vary depending upon a particular implementation. For example, mail item manager 170 may include one or more processors, one or more memories, one or more communications interfaces, etc., that are not depicted in FIG. 1D for purposes of explanation. Mail item management application 172 may be implemented by one or more processes for providing information to A/R glasses 130 to assist in sorting mail items, as described in more detail hereinafter. Mail item management application 172 may support an API that provides access to functionality of mail item management application 172. For example, the API may support commands that may be used by A/R glasses 130 to request information for mail items and to provide information to mail item management application 172, such as hash values, image data, status information, etc., as described in more detail hereinafter. The API may also provide access to information stored and managed by mail item management application 172.

OCR application 174 processes image data and generates OCR data that includes text identified in the image data. OCR application 174 may itself implement OCR functionality that recognizes text in image data, or OCR application 174 may invoke OCR functionality that is external to OCR application 174, for example, by making calls to external OCR services. OCR application 174 may be implemented by one or more processes executing on mail item manager 170.

Mail item management data 176 is data used by mail item management application 172 to manage mail items and more specifically to aid in sorting mail items using A/R glasses 130. FIG. 1E depicts an example embodiment of mail item management data 176 in the form of a table, where each row of the table corresponds to a mail item and includes a hash value, image data, OCR data, a sort location, and status history. Not all of these values are required and embodiments are applicable to fewer or additional values that may vary depending upon a particular implementation.

The hash value uniquely identifies a particular mail item and thereby provides accountability that can be used to comply with certain requirements, such as regulatory and legal requirements, etc. The hash value is generated by one or more hash functions, such as MD5, SHA-1, and SHA-2, etc., and may be for example, a hexadecimal number, a number, etc., of any length that may vary depending upon the particular hash function used. In the example depicted in FIG. 1D, the hash values are indicated as HV1-HV4 for purposes of explanation.

The image data represents an image of a mail item captured by a client device. The image data may be any type of image data that may vary depending upon a particular implementation and embodiments are not limited to any particular type or size of image data. Example image data formats include, without limitation, JPEG, Exif, TIFF, GIF, BMP, PNG, BAT, and BPG, but embodiments are not limited to these examples. The entries in mail item management data 176 may contain the actual image data for a mail item or a reference to image data. For example, image data may be stored external to mail item manager 170 and each image data entry includes a reference to corresponding image data stored at an external location, for example, at a server, cloud storage, etc. In the example depicted in FIG. 1D, the image data values are indicated as IMG1-IMG4 for purposes of explanation.

OCR data includes text identified in corresponding image data by OCR functionality. Example text includes, without limitation, sender information and recipient information for a mail item. Text may be stored as a list of text items separated by a delimiter, such as a comma, semicolon, etc. In the example depicted in FIG. 1E, the OCR data values are indicated as OCR1-OCR4 for purposes of explanation.

The sort location data specifies a location to which the mail item should next be sorted or routed, e.g., placed, and may be an intermediate or final location. For example, the sort location for a mail item may be a physical location within or external to mail item sorting facility 110. In the example depicted in FIG. 1E, the sort location values are indicated as Loc1-Loc4 for purposes of explanation.

Sort location values may be determined in many different ways that may vary depending upon a particular implementation. For example, a sort location value for a particular mail item may be determined from the OCR data for the particular mail item, where the OCR data specifies a destination for the particular mail item. The destination may be used directly as a sort location value, or to lookup a sort location value in the database of a business organization that specifies work locations of employees. This allows mail items to be sorted to the correct location even when an employee changes location within the business organization or when the employee is no longer to receive mail items because of change in responsibilities, departure, etc.

Sort location values may also be determined according to policies. For example, a policy may specify that mail items addressed to particular individuals, members of a logical group, such as a project, team, department, division, etc., are subject to a litigation hold and should be sorted to a specified destination. As another example, a policy of a business organization may specify that mail items addressed to particular individuals, such as certain executives, are to be routed to a particular destination because the mail items are likely to include sensitive or confidential information. Sort location values may be determined based upon government requirements, security requirements, etc. For example, a government entity may have determined that mail items sent to a particular destination should be quarantined for security or safety reasons. In this example, the sort location may correspond to a specified quarantine location.

The information/status includes information and/or status for the mail item. The information may include any attribute values of a mail item, such as a name, subject matter, contents, notifications, warnings, third-party data, etc. For example, the information may specify that a mail item contains a particular type of item, such as biological or hazardous material, is subject to a business organization, legal, or governmental restriction, such as a business policy, a litigation hold, an import or export restriction, etc. Status for a mail item may specify, for example, a date and time, a location, such as a current or last known location of a mail item, e.g., on a delivery truck or in a particular location of a mail item processing facility, and one or more actions performed on a mail item. For example, the status may specify that at a particular date and time, a mail item was delivered to a particular location.

In the example depicted in FIG. 1D, the status history data values are indicated as IS1-IS4 for purposes of explanation. An example of information/status is "12/10/18 13:10 Loc1; 12/10/18 14:27 Loc2; 12/10/18 18:30 Loc3." This example status history includes three entries separated by commas, where each entry specifies a date, a time, and a location, i.e., Loc1, Loc2, Loc3, along a delivery path where an action was performed with respect to the mail item. The action may be any type of action, such as receiving, sorting, a checkpoint, delivering, etc. In this manner, the information/status specifies a sequence of actions performed with respect to a mail item over time and may be used to manage mail items. For example, the information/status for mail items may be used to identify the current location and status of a mail item. As another example, the information/status, and in particular the date, time, and location information, may be used to analyze and improve mail item processing within an organization. Embodiments are not limited to the particular example depicted in FIG. 1E and mail item management data 176 may include other information that varies depending upon a particular implementation. As one example, mail item management data 176 may store the image data, or a link to the image data, for mail items.

Mail item manager 170 may support an API that A/R glasses 130 use to communicate with and invoke functionality on mail item manager 170. For example, the API allows A/R glasses 130 to send hash values and status information to mail item manager 170. The API may also allow a client device to access mail item management data 176. For example, the API may provide access to a graphical user interface, such as a Web-based graphical user interface, to view and manage mail item management data 176.

According to an embodiment, arrangement 100 includes a local mail item manager 180 that may be disposed within or nearby mail item sorting facility 110. Local mail item manager 180 may include the same elements as mail item manager 170 and implement the approach described herein in situations where communications are not possible with mail item manager 170, for example, because of a failure on network 190. Local mail item manager 180 may also be used instead of mail item manager 170 for other reasons, for example, because of high loading on mail item manager 170. In addition, local mail item manager 180 may have data that is specific to a particular implementation that mail item manager 170 does not have. For example, there may be changes in sort locations, local policies, security concerns, etc., that are known to, and reflected in the data maintained by local mail item manager 180 that are not known to mail item manager 170. A/R glasses 130 may communicate with local mail item manager 180 via a direct communications link, e.g., via Bluetooth, WiFi, WiGig, etc.

III. MAIL ITEM SORTING USING A/R GLASSES

A. Overview

According to an embodiment, sorting information is obtained for a mail item and used to assist a user wearing A/R glasses in sorting the mail item. The sorting information is used to visually distinguish the sort location for the mail item from other sort locations to assist the user in placing the mail item in the correct location. Embodiments include displaying, via the A/R glasses, status information for the mail item, allowing the user to override the sort location, and providing "out of view" assistance.

B. Obtaining Sorting Information for a Mail Item

FIG. 2 is a flow diagram 200 that depicts an approach for enhanced sorting of mail items using A/R glasses, according to an embodiment. For purposes of this example, it is presumed that a mail item has been received by receiving area 112a of mail item sorting facility 110, and routed to sorting area 114a and then to sorting area 114c. A user wearing A/R glasses 130 is at sorting area 114c and is responsible for sorting mail items to locations 116a-116n.

Figure 3A:
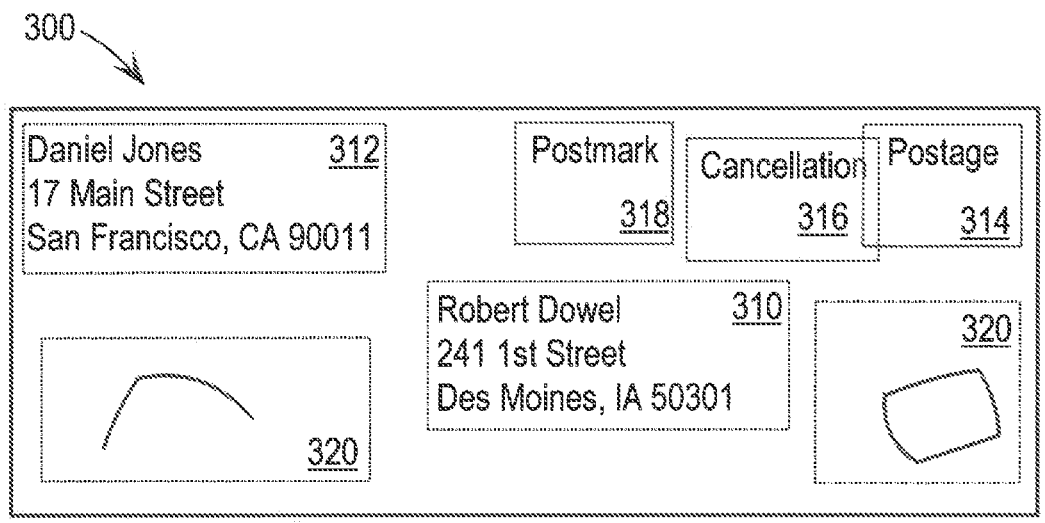
FIG. 3A depicts an example mail item in the form of a card or envelope that includes several features and artifacts.

FIG. 3A depicts an example mail item 300 in the form of a card or envelope that includes several features and artifacts. In this example, mail item 300 includes a recipient address 310 and a sender address 312 that each may be applied directly to mail item 300 or to a label that is applied to mail item 300. Mail item 300 also includes postage 314, a cancellation 316 that overlaps at least a portion of postage 314, and a postmark 318. Mail item 300 further includes two artifacts 320 that may represent, for example, marks, such as scuff marks, transportation marks etc., seams, folds, damage, etc., on mail item 300.

Figure 3B:
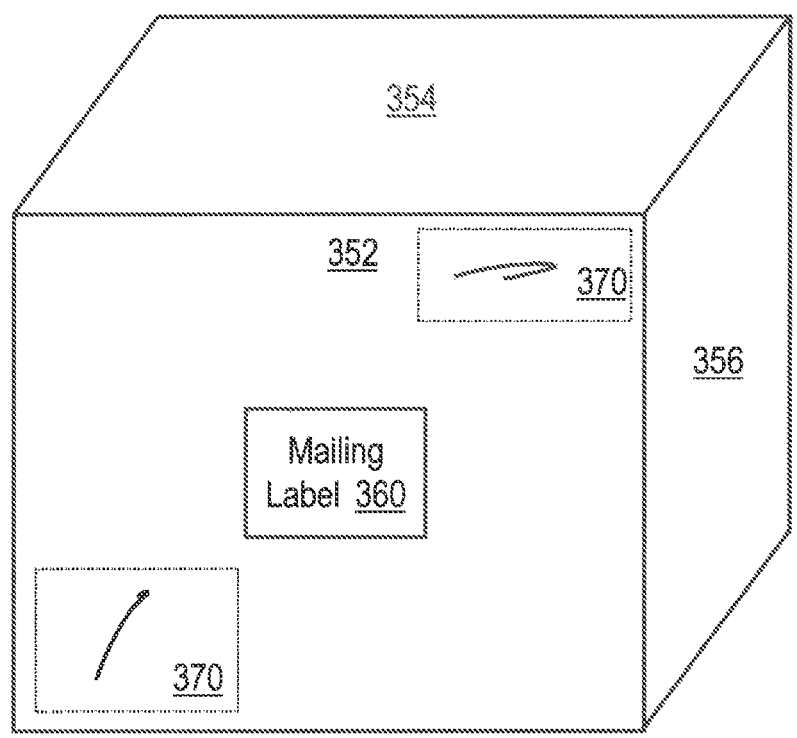
FIG. 3B depicts an example mail item in the form of a package or an item of commerce that includes a mailing label.

FIG. 3B depicts an example mail item 350 in the form of a package or an item of commerce that includes a mailing label 360. Mail item 350 is depicted in the shape of a cube for purposes of explanation only and mail item 350 may be any shape or size. Mail item 350 includes a front face 352, a top face 354, and a side face 356. Mail item 350 includes another side face, a rear face, and a bottom face that are not depicted in FIG. 3B. Mailing label 360 includes a recipient address and a sender address and may include other features, such as postage, a cancellation, and a postmark, etc. In the example depicted in FIG. 3B, mail item 350 also includes artifacts 370 on front face 352 that may be, for example, marks such as scuff marks, transportation marks, seams, folds, damage, etc.

In step 202, A/R glasses acquires an image of the mail item and generates image data. The mail item may be placed in a specified location for acquiring the image. For example, the mail item may be placed on a special purpose stand or held by the user. The user of A/R glasses 130 positions and/or aligns themselves so that the mail item is within the field of view of display 132.

Figure 4A:
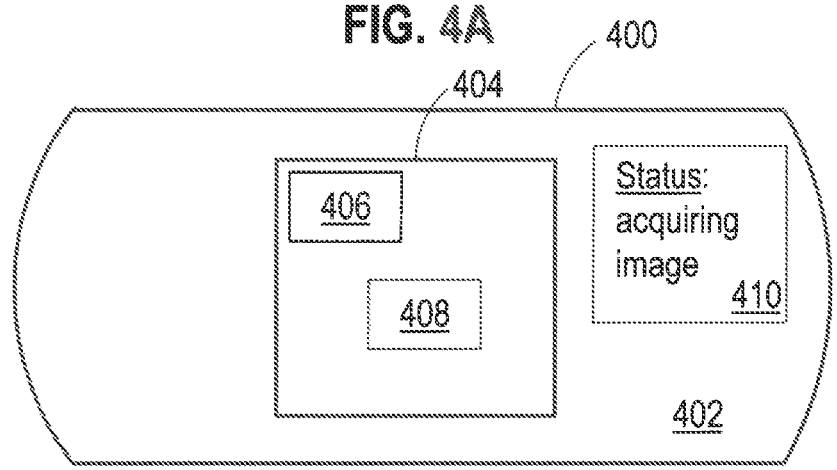
FIG. 4A depicts an example view provided by A/R glasses and more specifically, a view through a frame of a display, where the frame defines a viewable area in which the user may view their surroundings.

FIG. 4A depicts an example view provided by A/R glasses 130 and more specifically, a view through a frame 400 of display 132, where the frame 400 defines a viewable area 402 in which the user may view their normal surroundings. In other words, the user sees what they would normally see through a pair of glasses, with no magnification. In this example, a mail item 404, such as a card, letter, package, etc., is in front of the user and within the viewable area 402 and includes sender information 406 and recipient information 408. For purposes of explanation, the other normal surroundings of the user viewable within frame 400 are not depicted in FIG. 4A.

Using A/R glasses 130 in this manner allows the user to walk around and easily see when a mail item is within viewable area 402. According to an embodiment, A/R glasses 130 are configured to provide a visual indication via display 132 to indicate when a mail item is within the field of acquisition of image acquisition component 136. For example, a focal point, image capture polygon, other shape, border indicators, and/or directional indicators may be displayed on display 132 when a mail item is within capture range of image acquisition component 136.

The user then selects a control from controls 134, or issues a voice command, to cause image acquisition component 136 to capture an image of the mail item and generate image data for the image. For example, a user may select a button on the side of A/R glasses 130, or on a remote control, to cause image acquisition component 136 to capture an image of the mail item. The remote control may be any type of remote control, such as a hand-held device, a foot operated device, etc. As another example, the user may speak a command, such as "Acquire mail item" to cause image acquisition component 136 to capture an image of the mail item. Commands may be in any form and conform to recognized commands that may vary depending upon a particular implementation. Command strings may include a trigger word to indicate the start of a command string in the same manner as smart speakers and other voice-controlled devices. For example, a user may speak the command "SmartSort: acquire mail item," where the word "SmartSort" is a trigger word that signals the start of a command string. Microphone 138 captures and converts the audio into audio data that is processed by a voice recognition process implemented by mail sorting application 150, by other components in A/R glasses 130 or external to A/R glasses 130. The use of voice recognition in this manner allows the sorting of mail items with A/R glasses to be completely hands free.

Alternatively, an image of a mail item may be automatically captured in response to a signal that indicates that the mail item is within the capture area of image acquisition component 136. For example, a mail item may be placed at a designated location and the signal generated in response to detecting the presence of the mail item at the designated location. The presence of a mail item at the designated location may be determined, for example, by a scale, cameras, proximity sensors, RFID systems, etc.

One or more portions of a mail item, including an entire mail item, may be captured from any angle or view, and mail sorting application 150 causes the image data to be stored in storage 158. When the image of the mail item is captured, the image may include mailing information, for example sender information 406, recipient information 408 and other information on the mail item previously mentioned with respect to FIG. 3A, such as postage 314, cancellation 316, postmark 318, artifacts 320, 370, labels, tracking numbers, bar codes, QR codes, etc. Image data may be in any format that may vary depending upon a particular implementation and embodiments are not limited to image data being in any particular format.

According to an embodiment, acquired images may be cropped to remove unnecessary background information. For example, in FIG. 4A, one or more portions of the image outside mail item 404, but within viewable area 402, are removed from the acquired image. Mail sorting application 150 may include cropping functionality, or may invoke another process to perform cropping. Many different cropping algorithms and heuristics may be used, depending upon a particular implementation, and embodiments are not limited to any particular cropping algorithm or heuristic. For example, a cropping algorithm may identify areas to be removed from an image based upon recognizing the edges of mail item 404 within the image. Cropping images in this manner reduces the amount of storage and computational resources required to store and process image data, for example performing OCR processing as described in more detail hereinafter, and also increases accuracy.

A/R glasses 130 may optionally generate and store OCR data from the image data. The OCR data may include any text information included in the image of the mail item, such as a recipient address, sender address, etc., and the text information may be used by mail item manager 170 and/or other services, such as third-party services, to track and manage mail items. For example, the OCR data may be used to enforce any type of policies, legal requirements, or regulatory requirements. A/R glasses 130 may use its own OCR functionality, such as OCR application 148, to generate OCR data from the image data or invoke OCR functionality external to A/R glasses 130, for example, by making one or more calls to an external OCR library, service, application, etc., and then store the OCR data in storage 158.

According to an embodiment, status information 410 is displayed within viewable area 402 to provide information about current operations and/or information about mail items and may dynamically change over time. For example, when waiting for a next mail item, status information 410 may include "Status: awaiting mail item." When an image is being acquired and saved by A/R glasses 130, status information 410 may include "Status: acquiring image." As other examples, the status information 410 may correspond to the operations described in more detail hereinafter and may include "Status: saving image," "Status: generating hash value," after OCR has been performed "Status: sender and recipient identified," "Status: requesting sort location," "Status: place mail item in designated sort location," etc. These are example status messages and embodiments are not limited to any particular status messages, and status messages may vary depending upon a particular implementation.

In step 204, a representation of the image is generated. The representation of the image, also referred to herein as an "image representation" and "image representation data," is generated from the image data and according to an embodiment, is a value that uniquely identifies the image data and the corresponding image. According to an embodiment, the representation of the image is a hash value that is generated for the acquired image. For example, mail sorting application 150 may invoke hash application 146 to generate a hash value for the image by processing the image data using one or more hash functions that are implemented by hash application 146, or that are external to hash application 146. Because the image includes mailing information, other information and artifacts, the hash value uniquely identifies the mail item and provides a way to account for the mail item without having to attach identifying information to the mail item. For example, two mail items that have similar mailing labels, and even similar information on the mailing labels, may nonetheless be distinguished by other features, such as artifacts that are unique to each mail item. Hash values may be stored in storage 158. Although embodiments are depicted in the figures and described herein in the context of a representation of an image in the form of a hash value, embodiments are not limited to this example.

In step 206, the representation of the image is sent to mail item management application 172 and sorting information is requested. For example, mail sorting application 150 may generate and transmit to mail item management application 172 a message containing the representation, such as the hash value. The message may be sent, for example, via a wireless communications link between A/R glasses 130 and a wireless Access Point (WAP), and then forwarded to mail item management application 172 via network 190. The message may optionally include the image data and/or other information, such as a current location and/or status of the mail item. The status may include, for example, date and time information, a location, and/or one or more actions performed with respect to the mail item. The message may be in any format and may conform to an API supported by mail item management application 172.

According to an embodiment, mail item management application 172 supports a command that allows A/R glasses to query whether mail item management data 176 includes data for a particular mail item. For example, the API of mail item management application 172 may include support for a status check command. A/R glasses 130 issues, to mail item management application 172, a status check command with a hash value. Mail item management application 172 checks whether the mail item management data 176 includes an entry with the hash value and returns a result that indicates whether mail item management data 176 includes an entry for the particular hash value. Alternatively, the result may also include sorting information for the corresponding mail item. This allows A/R glasses 130 to obtain current information for a mail item at any time. According to an embodiment, the API for mail item management application 172 includes multiple status check commands. For example, a basic status check command may provide a result that indicates only whether mail item management data 176 includes an entry for the particular hash value. A full status check command may provide a result that indicates whether mail item management data 176 includes an entry for the particular hash value and if so, additional information for the mail item, such as special handling instructions, etc. Alternatively, the result may include the additional information for the mail item, allowing A/R glasses 130 to infer that mail item management data 176 includes an entry for the particular hash value.

If mail item management data 176 does include an entry for the particular hash value, then the A/R glasses do not need to send the image data to mail item management application 172 because the image data has already been sent by another client device. If mail item management data 176 does not include an entry for the particular hash value, then the A/R glasses knows that mail item management data 176 does not include an entry for the particular hash value and so the A/R glasses sends the image data, along with the hash value and status data, to mail item management application 172.

In step 208, the mail item management application 172 processes the request by extracting the representation of the image, such as a hash value, from the message and determining whether there is a current entry in mail item management data 176 with the same representation of the image, such as a hash value that is the same as the hash value extracted from the message. For example, suppose that the hash value extracted from the message is HV2. Referring to FIG. 1D, mail item management application 172 examines the hash values stored in mail item management data 176 to determine whether an entry has the hash value HV2. Alternatively, mail item management application 172 may examine an index for the hash value HV2 to determine whether mail item management data 176 includes an entry for the mail item. In the present example, since the hash value HV2 exists in mail item management data 176, then an entry has already been created for the mail item and mail item management application 172 may update the information/status for the mail item with information extracted from the message. This may include replacing a current status in the information/status data with the status extracted from the message, or appending the status extracted from the message to the information/status data already stored in the entry. For example, a new location, time stamp and action may be added to the entry in mail item management data 176.

If an entry for the received hash value does not exist in mail item management data 176, then mail item management application 172 may create a new entry for the mail item in mail item management data 176 and store the hash value, image data, and information and status in the new entry. Mail item management application 172 may obtain a sort location for the new entry by consulting data of a business organization. For example, mail item management application 172 may query personnel records of a business organization to obtain a sort location for the mail item.

There may be situations where mail item management data 176 includes multiple entries, i.e., for different mail items, with the same hash value. This may occur, for example, if the images for multiple mail items are so similar that the resulting hash values are the same. According to an embodiment, in response to determining that mail item management data 176 includes multiple entries, i.e., for different mail items, with the same hash value, mail item manager 170 provides a notification to allow manual resolution. For example, mail item manager 170 may generate and display a notification on a user interface of mail item manager 170, generate and transmit a notification to an administrative user e.g., via email, messaging, etc. In response to a notification, a user may manually inspect the image data for the entries with the same hash value and take corrective action, such as changing the image and/or hash value for one or more of the entries.

The mail item manager may optionally generate and store OCR data from the image data. The OCR data may include any text information included in the image of the mail item, such as a recipient address, sender address, etc., and the text information may be used by mail item manager 170 and/or other services, such as third-party services, to track and manage mail items. For example, the OCR data may be used to enforce any type of policies, legal requirements, or regulatory requirements. Mail item management application 172 may use its own OCR functionality to generate OCR data from the image data or invoke OCR functionality external to mail item management application 172, for example, by making one or more calls to an external OCR library, service, application, etc., and then store the OCR data in the entry for the mail item in mail item management data 176.

In step 210, the mail item manager generates and transmits sorting information to the A/R glasses. The sorting information may include a sort location as well as other information, such as information about the mail item. For example, mail item management application 172 extracts the sort location for the entry in mail item management data 176, and then generates and transmits a response to A/R glasses 130 that includes the sort location. In the present example, since the second row of mail item management data 176 includes the hash value HV2, the corresponding sort location of Loc2 is included in the response sent to A/R glasses 130.

In the situation where mail item management data 176 does not include an entry for the mail item and one is created, and where a sort location cannot be determined for the mail item, the sorting information sent by the mail item manager to the A/R glasses may indicate that no sort location could be found for the mail item. This condition may be reported to the user of the A/R glasses, as described hereinafter and in response to being notified, the user may elect to move the mail item to a designated location, for example, for special processing. The sorting information may also include information and status from the information/status field of mail item management data 176, as described in more detail hereinafter.

C. Using Sorting Information to Assist a User in Sorting Mail Items

In step 212, the response is received from the mail item manager and the A/R glasses use the sorting information from the response to assist the user in sorting the mail item. The sorting information may be used in many different ways to assist the user. For example, mail sorting application 150 extracts the sorting information from the message and displays on display 132 of A/R glasses 130, information that assists the user in placing the mail item in the correct location. This may include, for example, displaying an identification of the sort location, such as information that identifies a particular sort bin.

Figure 4B:
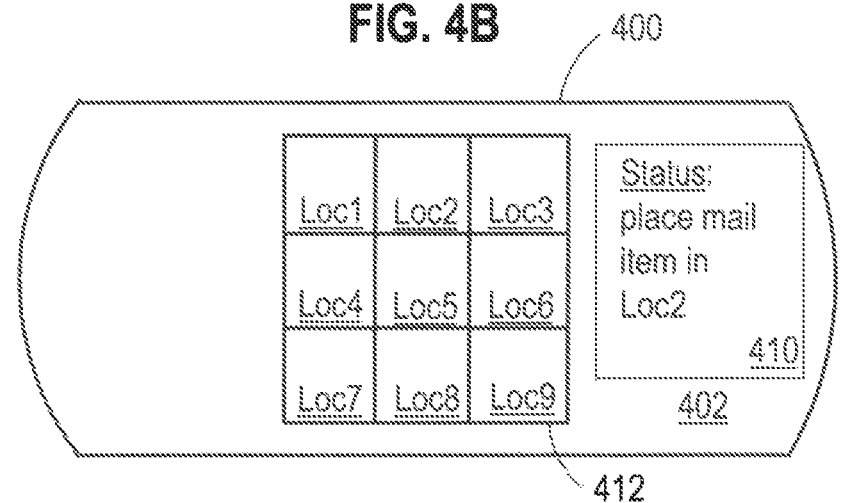
FIG. 4B depicts an example view provided by A/R glasses of a stack of sort bins.

FIG. 4B depicts an example view provided by A/R glasses 130 of a stack of sort bins 412 that includes nine individual sort bins, identified as Loc1-Loc9. Sort bins 412 are physical areas, structures, or compartments into which mail items, such as cards, letters, envelopes, packages, articles of commerce, etc., may be placed. Although depicted in FIG. 4B as being uniform in shape and size, embodiments are not limited to this example, and sort bins 412 may be different shapes and sizes. In addition, sort bins 412 do not need to be contiguous as depicted in FIG. 4B, and may be arranged in contact with other sort bins 412 and/or separated from other sort bins 412.

In this example, A/R glasses 130 are far enough away from sort bins 412 so that all of the sort bins 412 are within frame 400, but this is not required. In some situations, the user may be closer to sort bins 412 such that only a subset of sort bins 412 are viewable within frame 400. In this example, mail sorting application 150 causes status information 410 in FIG. 4A to instruct the user to place the mail item in a particular location, e.g., "Status: place mail item in Loc2," since this is the sort location for the mail item, as indicated by the second row of mail item management data 176 that corresponds to the mail item with a hash value of HV2. In situations where the sorting information received from mail item manager 170 indicates that a sort location could not be found for the mail item, status information 410 may display an error message, such as "Status: no sort location found." The user may then manually select a sort location for the mail item in accordance with the user override of sort locations described hereinafter.

Figure 4C:
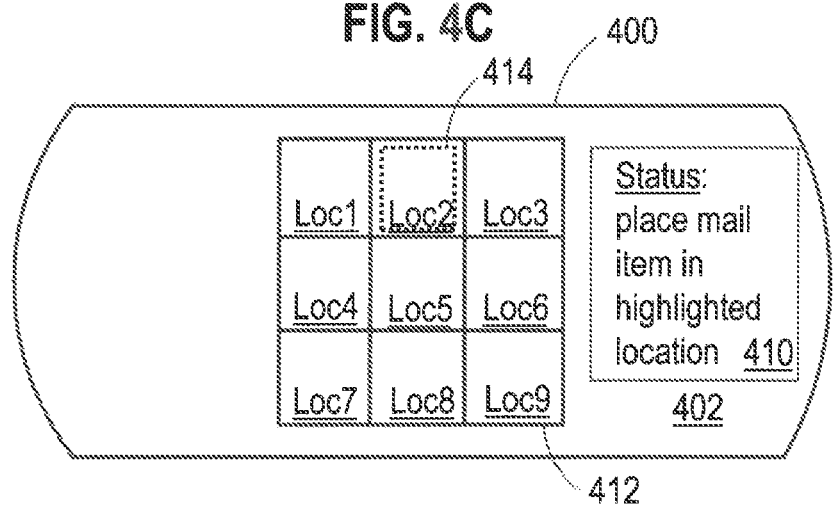
FIG. 4C depicts an example view provided by A/R glasses in which the sort location is visually distinguished from other sort locations using one or more user interface objects that are displayed within the viewable area.

As another example, one or more graphical user interface objects may be displayed on display 132 of A/R glasses 130 in a manner to visually distinguish a sort location from other sort locations. FIG. 4C depicts an example view provided by A/R glasses 130 in which the sort location is visually distinguished from other sort locations using one or more user interface objects that are displayed within the viewable area 402. In this example, a visual indicator 414 in the form of a rectangle is superimposed on sort location Loc2, which is the sort location for the mail item, as indicated by the second row of mail item management data 176 that corresponds to the mail item with a hash value of HV2. Any type of visual indication may be used to visually distinguish the correct sort location from other sort locations and embodiments are not limited to any particular type of visual indication. Example visual indications include, without limitation, outlines, highlights, colors, graphics, special characters, any type of special effect, etc. For example, sort location Loc2 may be displayed in green, while the other sort locations are displayed in red. FIG. 4D depicts an example view provided by A/R glasses 130 in which the sort location is visually distinguished from other sort locations using multiple visual indicators. In this example, visual indicator 414 is superimposed on sort location Loc2 to indicate that sort location Loc2 is the correct sort location, and X's are superimposed over the other sort locations to indicate that they are not the correct sort location. This makes it easier for the user to identify the correct sort location for a mail item, which improves accuracy and reduces stress on users, particularly when sorting large numbers of mail items. Color and/or other symbols may be used in combination with these examples to further distinguish the correct sort location from other sort locations.

Graphical user interface objects may also be used to assist users in positioning and aligning A/R glasses 130 with respect to sort bins 412. FIG. 4E depicts an example view provided by A/R glasses 130 in which a reference frame 416 is displayed within the viewable area 402 of display 132 to aid the user in correctly positioning and aligning A/R glasses 130 with respect to sort bins 412. More specifically, when the user moves to a location and orientation so that the outline of sort bins 412 is closely aligned with reference frame 416, visual indicator 414 may be properly superimposed on sort location Loc2, as described in more detail hereinafter.

Since the representation of a mail item, e.g., the hash value, does not change over time, the process in steps 202-212 may be repeated any number of times for sorting, for example, as mail items progress through one or more sort points along a delivery path.

D. User Override of Sort Locations

According to one embodiment, users may override the sort location designated for a mail item and instead place the mail item into a different sort location. This may occur in a wide variety of situations. A user may have personal knowledge that a mail item should be placed into a different sort location than the designated sort location. For example, the user may have learned that mail items designated for a particular sort location should instead be placed in a different sort location. This may be based, for example, on an organization policy, safety, or hazard concerns.

According to an embodiment, A/R glasses 130 are configured to allow a user to override a designated sort location by selecting a control from controls 134, or by issuing an audio command. FIG. 4F depicts an example view provided by A/R glasses 130 in which the user of A/R glasses 130 places the mail item in a different location than the designated sort location. In this example, the user places the mail item in Loc6 instead of Loc2, which is the designated sort location for the mail item. A/R glasses 130 are capable of detecting that the mail item was placed in Loc6 and may ask for a confirmation from the user. For example, as depicted in FIG. 4F, status information 410 queries the user whether the location for the mail item should be updated to Loc6. The user may respond to this query by selecting a control from controls 134 or by speaking an audio command, such as "Yes."

In response to a user confirmation that the location for the mail item should be updated to Loc6, mail sorting application 150 updates mail item management data 176, for example, by issuing an update request to mail item management application 172. The update request may include an update command supported by the API of mail item management application 172, the representation of the image for the physical mail item, such as the hash value, and an updated sort location for the mail item. The update request causes the sort location for the mail item to be updated to Loc6, and may also cause the status history to be updated to indicate that the sort location was overridden to a different sort location. For example, mail item management application 172 uses the hash value from the update request to identify the entry in mail item management data 176 to be updated, and then substitutes the current sort location in the entry with the updated sort location contained in the update request.

The user override feature may also be used in situations where a mail item does not have a sort location. For example, suppose that no sort location is identified for a mail item and as previously described herein, status information 410 displays an error message, such as "Status: no sort location found." The user may manually select a sort location for the mail item and A/R glasses 130 queries the user to confirm the sort location for the mail item. In response to a user confirmation that the location for the mail item should be updated to Loc6, mail sorting application 150 updates mail item management data 176, for example, by issuing an update command to mail item management application 172.

According to an embodiment, additional information 418 pertaining to mail items is displayed within viewable area 402. Additional information 418 may be provided by mail item manager 170 when sorting information is requested, as previously described herein, or additional information 418 may include information from A/R glasses 130, such as information obtained via OCR. Additional information 418 may be displayed anywhere within viewable area 402, and in FIG. 4F is depicted as being displayed to the left of sort bins 412 for purposes of explanation. Additional information 418 may include, for example, any information about the subject mail item, such as information that might be of use to the user of A/R glasses 130. Examples of additional information include, without limitation, information that provides a description of a mail item, any of the OCR information for a mail item, information that indicates the contents of a mail item, the relevance of a mail item, and/or a status of a mail item, special processing or special handling information, for example, that the mail item should be sorted to a particular location based upon a policy, or information from an external source, such as a government entity, e.g., that the mail item is related to a security or medical threat and/or contains a special material or liquid, should be routed to a special location. For example, additional information 418 may specify that the recipient is no longer employed by a business entity or organization, and that the mail item should be sorted to a specified sort location, which may be associated with another person, department, group, etc. As another example, additional information 418 may specify that the mail item contains dangerous or fragile material and should be handled in a specific manner and/or sorted to a specified location. As yet another example, additional information 418 may specify that the mail item is subject to a litigation hold and should be sorted to a special sort location associated with the litigation hold.

E. Determining Sort Locations on A/R Glasses

Various techniques may be used to superimpose information on display 132 in the correct location. As previously described with respect to FIG. 4C, visual indication 414 is displayed on the Loc2 sort bin to visually distinguish the Loc2 sort bin from the other sort bins 412. According to one embodiment, it is assumed that the user of A/R glasses 130 centers sort bins 412 within viewable area 402. Given this assumption and the known physical dimensions of sort bins 412, the location of sort bin Loc2 on display 132 can be determined. For example, sort bin Loc5 is centered in viewable area 402, while sort bin Loc2 is located top center in viewable area 402. The physical dimensions of sort bins 412 may be stored in storage 158. This approach allows visual indication 414 to be superimposed over the correct sort location, so long as the user generally centers sort bins 412 within viewable area 402, which is aided by the use of reference frame 416. Physical markers at sorting locations may also be used to help users properly position themselves with respect to sort bins 412. For example, visual markers may be placed in the physical surroundings, such as on the floor, walls, ceiling, etc., to help the user properly position themselves, or to at least provide a coarse starting point.

According to an embodiment, image analysis is used to determine the location of sort bins 412 within viewable area 402. Mail sorting application 150 acquires an image and analyses the image data to determine the location of sort bins 412 within viewable area 402. This may be done using content analysis to identify unique features of sort bins 412, such as outline, edges, other distinguishing features, etc., within the image. For example, the center or a corner of sort bins 412 may be identified in the captured image using specific colors, shapes, sizes, special markers, etc. Markers, such as physical and/or electronic objects, that are more easily recognized in image data, may be placed at specified locations, such as the center or a corner of sort bins 412. Once the location of sort bins 412 within the image is determined, the location of the sort location can be determined and visually distinguished as described herein.

According to an embodiment, the position of A/R glasses 130 and of sort bins 412 is used to determine the location of a sort bin within viewable area 402. The position of A/R glasses 130 may be determined based upon, for example, Global Positioning System (GPS) data, proximity sensors, etc. Once the F. "Out of View" Assistance As described herein, the approaches assist users in sorting mail items by superimposing information on the display of A/R glasses 130. This allows users to move or roam within an area where mail items are being sorted. In situations where users are expected to move to a designated location in front of and face sort bins 412, the users may be assisted in locating the correct sort bin using the approaches described herein. There may be situations, however, where the correct sort location for a mail item is "out of view" of the user, i.e., outside viewable area 402. This may occur when the user of A/R glasses 130 is not facing sort bins 412, for example, if the user has turned away from sort bins 412 to look in another direction, or if the user had just sorted a mail item into a different set of sort bins outside viewable area 402.

Figure 5:
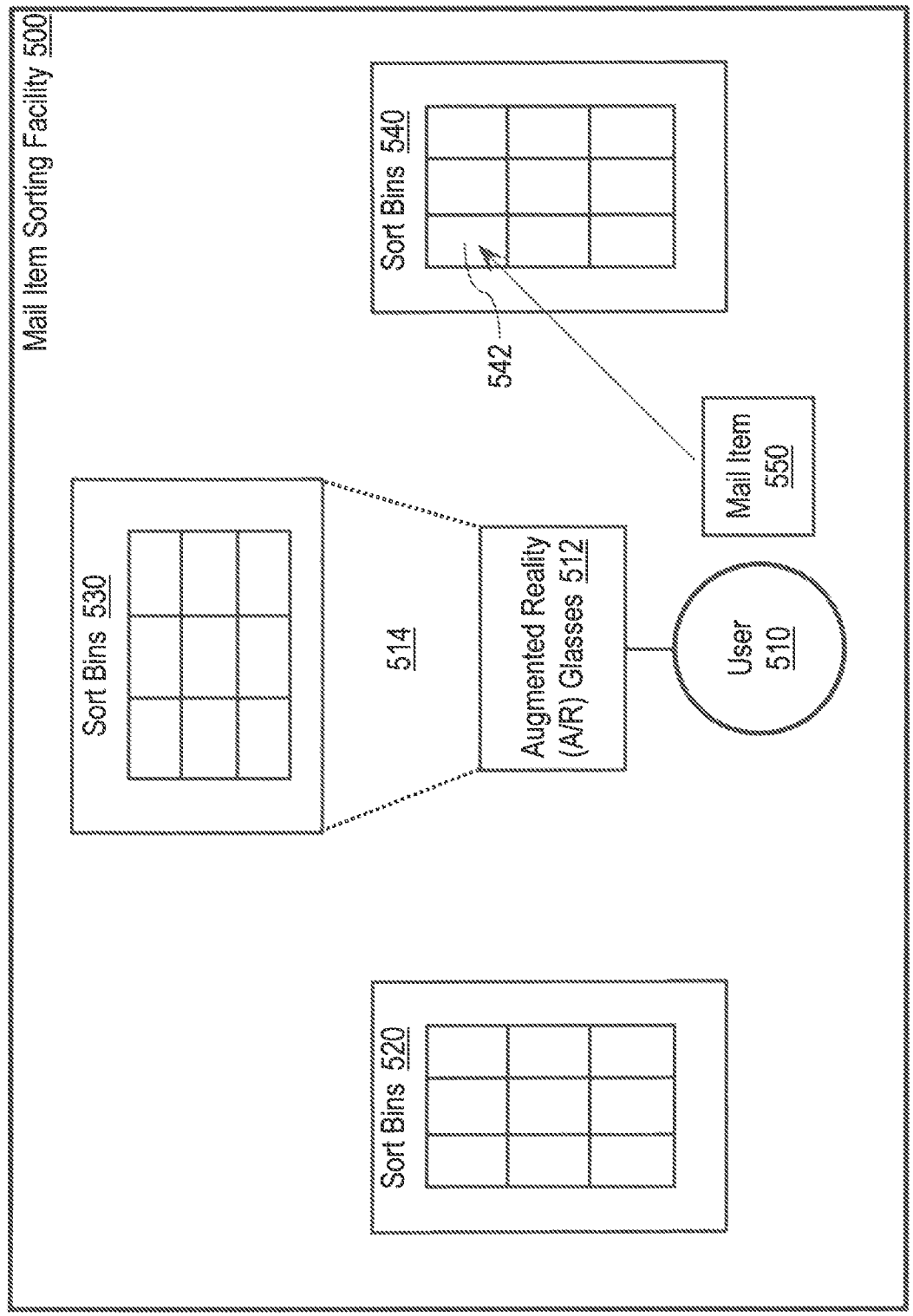
FIG. 5 is a block diagram that depicts a mail item sorting facility.

FIG. 5 is a block diagram that depicts a mail item sorting facility 500. Mail item sorting facility 500 may be, for example, located within a business enterprise or organization, or within a mail item carrier business. Mail item sorting facility 500 includes a user 510 of A/R glasses 512 that has a viewable area 514. A/R glasses 512 may be the same as A/R glasses 130 previously described herein. Mail item sorting facility 500 also includes sort bins 520, 530, 540 that each have a plurality of sort locations in the form of sort bins. Sort bins 520, 530, 540 each have nine sort bins of the same size for purposes of explanation, and embodiments are not limited to this example.

As depicted in FIG. 5, user 510 is wearing A/R glasses 512 and is facing sort bins 530. This may be, for example, because user 510 has just completed sorting a mail item into sort bins 530. As a result, sort bins 530 are within viewable area 514 of A/R glasses 512, while sort bins 520, 540 are not within viewable area 514. User 510 has initiated sorting of a mail item 550 and A/R glasses 512 has received sorting information from a mail item manager. The sorting information indicates that mail item 550 is to be sorted to a sort bin 542 which, along with all of sort bins 540, is currently outside viewable area 514 of A/R glasses 512.

According to an embodiment, A/R glasses are configured to visually assist users in sorting mail items to sort locations that are not currently within the viewable area of the A/R glasses. The visual assistance may be implemented in many different ways and embodiments are not limited to any particular way. FIG. 4G depicts an example of "out of view" assistance provided by A/R glasses 512. In this example, status information 410 instructs the user by the status, "Status: sort bin out of view—turn in direction of arrow" and additional information 418 includes text instructing user 510 to "Turn Right." In addition, a graphic 420 in the form of a right-pointing arrow visually indicates that the user should turn right to find the sort bin for mail item 550. Thus, the specific visual assistance provided to the user is based upon the location of the sort location relative to the current location and orientation of the A/R glasses. According to an embodiment, the current location and orientation of A/R glasses 512 is based upon Global Positioning System (GPS) data, proximity sensors, the positioning of A/R glasses 512 by user 510 at a known location, etc. For example, mail item sorting facility 500 may include a specified location where users of A/R glasses stand during sorting of mail items. The location of sort bins 520, 530, 540 is known within mail item sorting facility 500. The current location and orientation of A/R glasses 512 and sort bins 520, 530, 540 may be represented by position data stored in storage 158. For example, A/R glasses 512 may be configured, via position data stored in storage 158, with the location of the designated location where users stand during mail item sorting, and the locations of sort bins 520, 530, 540. Alternatively, or in addition to, the current location and orientation of A/R glasses 512 and sort bins 520, 530, 540 may be maintained by local mail item manager 180. In the present example, an analysis of the current location and orientation of A/R glasses 512 and sort bins 520, 530, 540 indicates that user 510 should turn to the right to reach the sort bin for mail item 550. Status information 410 and additional information 418 may be dynamically updated as the orientation and/or location of A/R glasses 512 changes.

Although embodiments are described here in the context of A/R glasses for purposes of explanation, embodiments are not limited to A/R glasses or even human-wearable devices and are applicable to stand-alone display devices. For example, mail item sorting facility 500 may be configured with display devices that assist users in locating the correct sort bin for a mail item. The display devices may be adjacent each of sort bins 520, 530, 540 and include one or more of the components of A/R glasses 130 to provide the functionality described herein.

Figure 6:
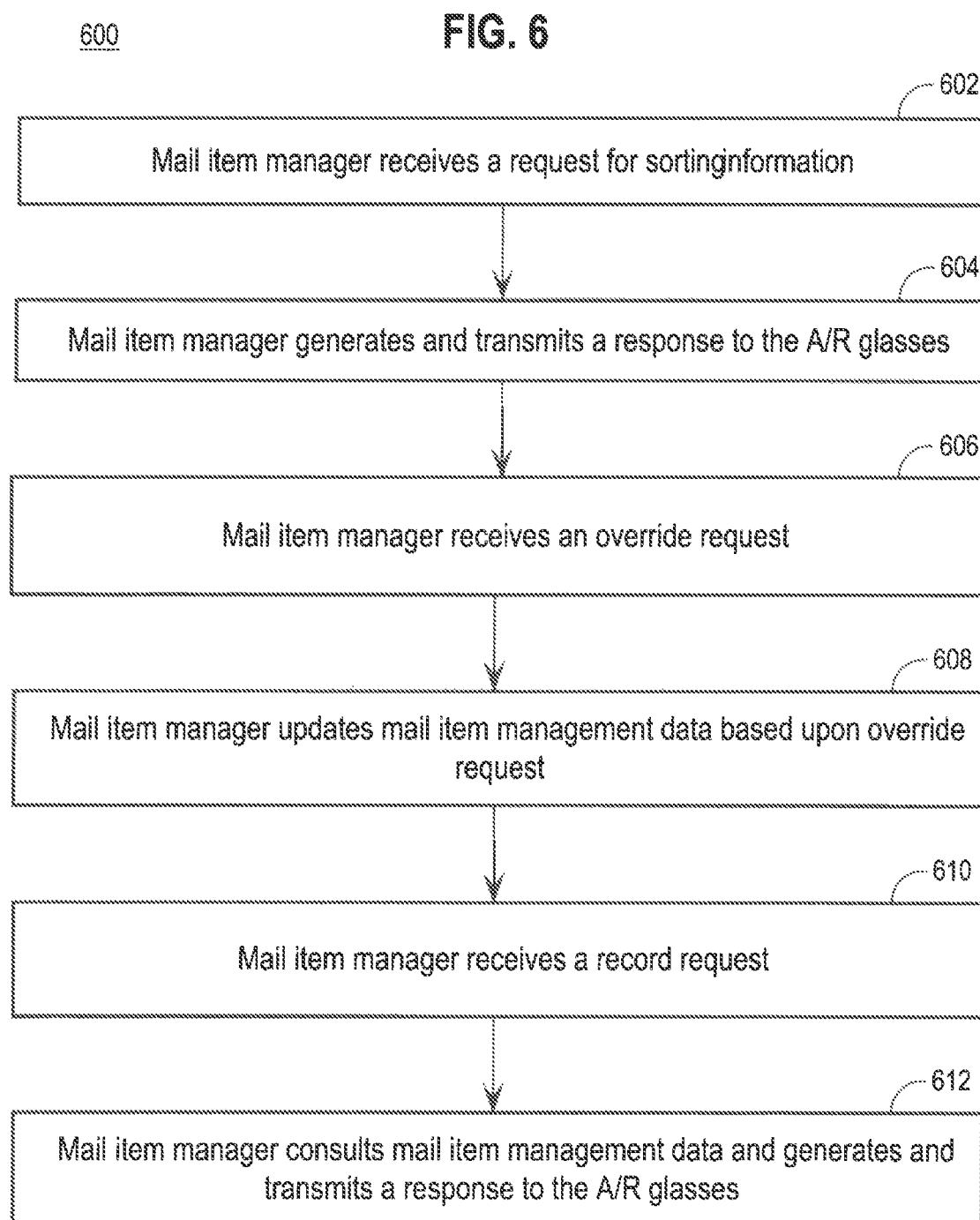
FIG. 6 is a flow diagram that depicts an approach for sorting mail items using A/R glasses from the perspective of a mail item manager.

FIG. 6 is a flow diagram 600 that depicts an approach for sorting mail items using A/R glasses from the perspective of mail item manager 170. In step 602, mail item manager 170 receives a request for sorting information for a mail item. For example, as previously described herein, a request for sorting information is received from A/R glasses 130 and the request includes a representation of an image of the mail item, such as a hash value. In step 604, mail item manager 170 generates and transmits a response to A/R glasses 130. This includes mail item manager 170 locating an entry in mail item management data 176 that has a hash value that matches the hash value in the request. Mail item manager 170 retrieves the sort location from the corresponding sort location field and generates a the response. The response may also include information and/or status from the information/status field. If mail item management data 176 does not include an entry for the mail item and one is created, and where a sort location cannot be determined for the mail item, the sorting information sent by the mail item manager to the A/R glasses may indicate that no sort location could be found for the mail item. A/R glasses 130 process the response and use the sorting information to visually guide the user to the correct sort location for the mail item.

In step 606, mail item manager 170 receives from A/R glasses 130 an override request that specifies an override sort location that was selected by the user of A/R glasses 130. As previously described herein, users may choose to sort a mail item to a different sort location than the designated sort location indicated by A/R glasses 130. In step 608, mail item manager 170 updates mail item management data 176 based upon the override request by, for example, changing the sort location in the sort location field and/or specifying the override sort location in the information/status field.

In step 610, mail item manager 170 receives a record request, i.e., a request asking whether a record exists in mail item management data 176 for a specified hash value. In step 612, mail item manager 170 consults mail item management data 176 to determine whether a record exists that has the same hash value as the hash value from the request. Mail item manager 170 then generates and transmits to A/R glasses 130 a response indicating whether the record exists.

The aforementioned approaches provide a lightweight solution for sorting mail items that reduces the amount of data transmitted over network 190 and improves the functioning of computing devices in arrangement 100. More specifically, the data provided by A/R glasses 130 to mail item manager 170 may be implemented in a manner to use a very small amount of data. For example, the hash value may be a single number and the status may be a short alphanumeric code that corresponds to a particular status. For example, a mail service provider may establish a set of statuses and corresponding alphanumeric status codes that are known to A/R glasses 130 and a mail item manager of the mail service provider. Once the image data for a mail item has been made available to mail item manager 170, A/R glasses 130 need to report only the hash value, timestamp information, and a status code to the mail item manager to allow mail item manager 170 to track and manage mail items.

In situations where the amount of data transferred between A/R glasses 130 and mail item manager 170 is not a concern, and where A/R glasses 130 do not have the capability to generate a hash value for an image, or where it is desirable for the A/R glasses to reduce the computational load on the A/R glasses, A/R glasses 130 may transmit image data to mail item manager 170, which generates the hash values for the image data. For example, A/R glasses 130 transmits image data, or a link to image data, along with time stamp data and status data to mail item manager 170. Mail item manager 170 generates a hash value for the image, either by a hash application implemented on mail item manager, or via external hash functions. This reduces the computational burden on A/R glasses 130 at the expense of an increased amount of data transmitted from A/R glasses 130 to mail item manager 170. In addition, local mail item manager 180 may be used when communications with mail item manager 170 are not available or when, because of workload or other conditions, it is preferable to use local mail item manager 180.

IV. IMPLEMENTATION EXAMPLES

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
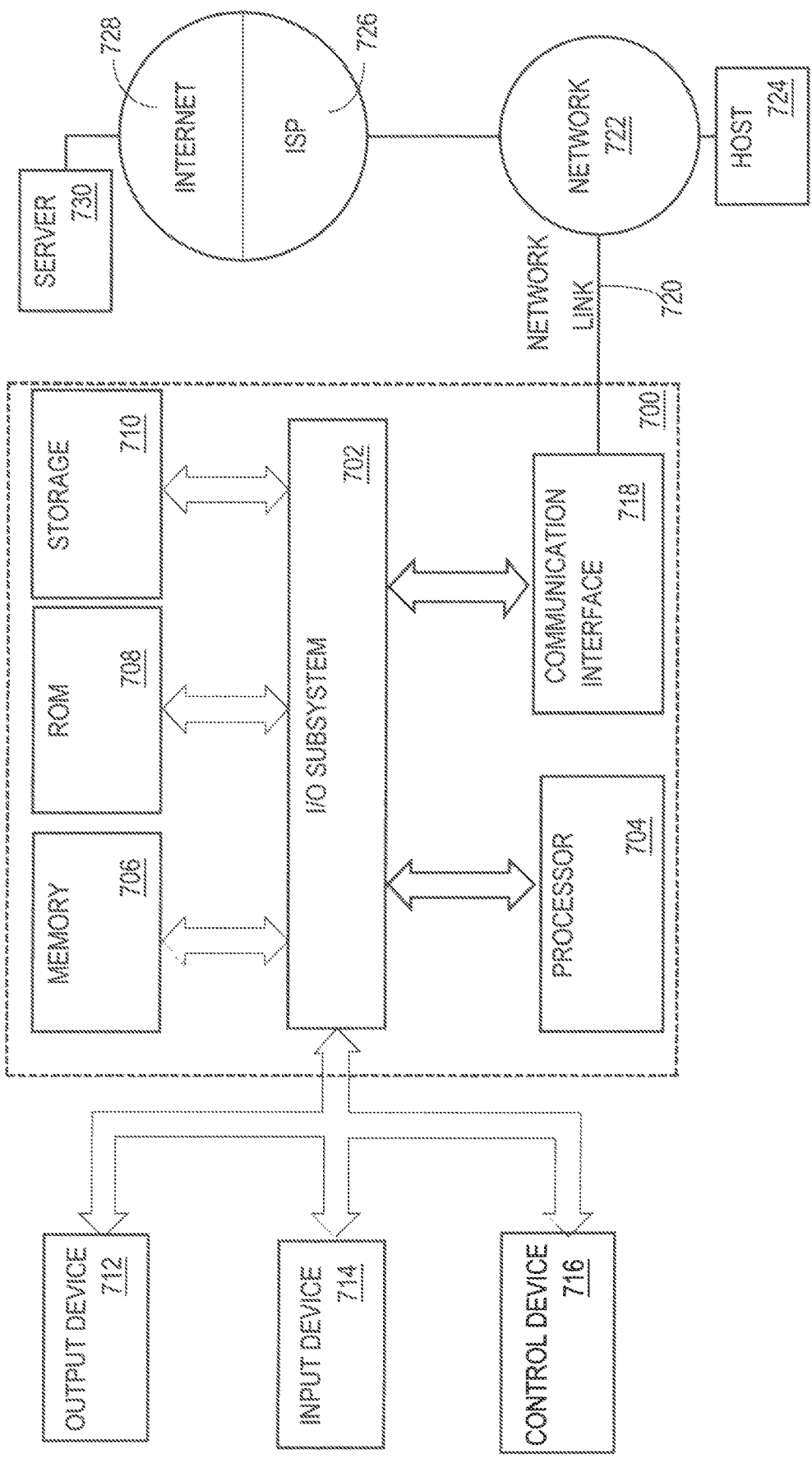
FIG. 7 is a block diagram that depicts an example computer system upon which embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A computing device comprising:
   one or more processors;
   one or more memories;
   a mail item manager executing on the computing device configured to:
   receive, from a human-wearable computing device, image representation data that uniquely identifies an image of a physical mail item from a plurality of physical mail items,
   identify an entry in mail item management data includes an entry having a value that is the same as the image representation data that represents the image of the physical mail item,
   retrieve, from the entry in the mail item management data, data that specifies a physical sort location for the physical mail item,
   generate sorting information that includes the physical sort location for the physical mail item,
   cause the sorting information to be transmitted to the human-wearable computing device, wherein the human-wearable computing device uses the sorting information to assist a user of the human-wearable computing device in placing the physical mail item at the physical sort location.

2. The computing device as recited in claim 1, wherein the image representation data is a hash value that uniquely identifies the image of the physical mail item.

3. The computing device as recited in claim 1, wherein the sorting information includes information about the physical mail item.

4. The computing device as recited in claim 3, wherein the information about the physical mail item includes one or more of contents of the physical mail item or special handling information for the physical mail item.

5. The computing device as recited in claim 1, wherein the mail item manager is further configured to:
   receive, from the human-wearable computing device, an update request to update the physical sort location for the physical mail item, wherein the update request includes the image representation data that uniquely identifies the image of the physical mail item and an updated physical sort location for the physical mail item,
   in response to receiving, from the human-wearable computing device, the update request to update the physical sort location for the physical mail item, identify the entry in the mail item management data that has the value that is the same as the image representation data, and
   update data that specifies the physical sort location for the physical mail item with the updated physical sort location for the physical mail item.

6. The computing device as recited in claim 1, wherein the mail item manager is further configured to:
   receive, from the human-wearable computing device, a status request for the physical mail item, wherein the status request includes the image representation data that uniquely identifies the image of the physical mail item, wherein the status request conforms to an Application Program Interface (API) supported by the mail item manager,
   in response to receiving, from the human-wearable computing device, the status request, determine whether the mail item management data has an entry with a value that is the same as the image representation data,
   generate and transmit to the human-wearable computing device, a response indicating whether the mail item management data has an entry with a value that is the same as the image representation data.

7. The computing device as recited in claim 6, wherein the response indicating whether the mail item management data has an entry with a value that is the same as the image representation data includes information about the physical mail item.

8. One or more non-transitory computer-readable media storing instructions which, when processed by one or more processors, cause:
   receiving, by a mail item manager executing on a computing device, from a human-wearable computing device, image representation data that uniquely identifies an image of a physical mail item from a plurality of physical mail items,
   identifying, by the mail item manager executing on the computing device, an entry in mail item management data includes an entry having a value that is the same as the image representation data that represents the image of the physical mail item,
   retrieving, by the mail item manager executing on the computing device, from the entry in the mail item management data, data that specifies a physical sort location for the physical mail item,
   generating, by the mail item manager executing on the computing device, sorting information that includes the physical sort location for the physical mail item,
   causing, by the mail item manager executing on the computing device, the sorting information to be transmitted to the human-wearable computing device, wherein the human-wearable computing device uses the sorting information to assist a user of the human-wearable computing device in placing the physical mail item at the physical sort location.

9. The one or more non-transitory computer-readable media as recited in claim 8, wherein the image representation data is a hash value that uniquely identifies the image of the physical mail item.

10. The one or more non-transitory computer-readable media as recited in claim 8, wherein the sorting information includes information about the physical mail item.

11. The one or more non-transitory computer-readable media as recited in claim 10, wherein the information about the physical mail item includes one or more of contents of the physical mail item or special handling information for the physical mail item.

12. The one or more non-transitory computer-readable media as recited in claim 8, further storing additional instructions which, when processed by the one or more processors, cause:
   receiving, from the human-wearable computing device, an update request to update the physical sort location for the physical mail item, wherein the update request includes the image representation data that uniquely identifies the image of the physical mail item and an updated physical sort location for the physical mail item,
   in response to receiving, from the human-wearable computing device, the update request to update the physical sort location for the physical mail item, identifying the entry in the mail item management data that has the value that is the same as the image representation data, and
   updating data that specifies the physical sort location for the physical mail item with the updated physical sort location for the physical mail item.

13. The one or more non-transitory computer-readable media as recited in claim 8, further storing additional instructions which, when processed by the one or more processors, cause:
   receiving, from the human-wearable computing device, a status request for the physical mail item, wherein the status request includes the image representation data that uniquely identifies the image of the physical mail item, wherein the status request conforms to an Application Program Interface (API) supported by the mail item manager,
   in response to receiving, from the human-wearable computing device, the status request, determining whether the mail item management data has an entry with a value that is the same as the image representation data,
   generating and transmitting to the human-wearable computing device, a response indicating whether the mail item management data has an entry with a value that is the same as the image representation data.

14. The one or more non-transitory computer-readable media as recited in claim 13, wherein the response indicating whether the mail item management data has an entry with a value that is the same as the image representation data includes information about the physical mail item.

15. A computer implemented method comprising:
receiving, by a mail item manager executing on a computing device, from a human-wearable computing device, image representation data that uniquely identifies an image of a physical mail item from a plurality of physical mail items,
identifying, by the mail item manager, an entry in mail item management data includes an entry having a value that is the same as the image representation data that represents the image of the physical mail item,
retrieving, by the mail item manager, from the entry in the mail item management data, data that specifies a physical sort location for the physical mail item,
generating, by the mail item manager, sorting information that includes the physical sort location for the physical mail item,
causing, by the mail item manager, the sorting information to be transmitted to the human-wearable computing device, wherein the human-wearable computing device uses the sorting information to assist a user of the human-wearable computing device in placing the physical mail item at the physical sort location.

16. The computer-implemented method as recited in claim 15, wherein the image representation data is a hash value that uniquely identifies the image of the physical mail item.

17. The computer-implemented method as recited in claim 15, wherein the sorting information includes information about the physical mail item.

18. The computer-implemented method as recited in claim 17, wherein the information about the physical mail item includes one or more of contents of the physical mail item or special handling information for the physical mail item.

19. The computer-implemented method as recited in claim 15, further comprising:
receiving, from the human-wearable computing device, an update request to update the physical sort location for the physical mail item, wherein the update request includes the image representation data that uniquely identifies the image of the physical mail item and an updated physical sort location for the physical mail item,
in response to receiving, from the human-wearable computing device, the update request to update the physical sort location for the physical mail item, identifying the entry in the mail item management data that has the value that is the same as the image representation data, and
updating data that specifies the physical sort location for the physical mail item with the updated physical sort location for the physical mail item.

20. The computer-implemented method as recited in claim 15, further comprising:
receiving, from the human-wearable computing device, a status request for the physical mail item, wherein the status request includes the image representation data that uniquely identifies the image of the physical mail item, wherein the status request conforms to an Application Program Interface (API) supported by the mail item manager,
in response to receiving, from the human-wearable computing device, the status request, determining whether the mail item management data has an entry with a value that is the same as the image representation data,
generating and transmitting to the human-wearable computing device, a response indicating whether the mail item management data has an entry with a value that is the same as the image representation data.

\* \* \* \* \*